United States Patent [19]
Kahle et al.

[11] Patent Number: 5,761,473
[45] Date of Patent: Jun. 2, 1998

[54] METHOD AND SYSTEM FOR INCREASED INSTRUCTION SYNCHRONIZATION EFFICIENCY IN A SUPERSCALAR PROCESSSOR SYSTEM UTILIZING PARTIAL DATA DEPENDENCY INTERLOCKING

[75] Inventors: James Allan Kahle; Chin-Cheng Kau, both of Austin, Tex.

[73] Assignee: International Business Machines Corporation, Armonk, N.Y.

[21] Appl. No.: 1,863

[22] Filed: Jan. 8, 1993

[51] Int. Cl.⁶ .............................. G06F 9/38; G06F 9/345
[52] U.S. Cl. ............................. 395/393; 364/DIG. 1; 364/DIG. 2; 395/382
[58] Field of Search ........................ 395/800, 275, 395/375, 500, 250, 425, 400, 650, 575, 496, 562, 382, 393, 394, 389; 364/DIG. 1, DIG. 2, 748.16

[56] References Cited

U.S. PATENT DOCUMENTS

| | | | |
|---|---|---|---|
| 3,651,482 | 3/1972 | Benson et al. | 340/172.5 |
| 3,718,912 | 2/1973 | Hasbrouck et al. | 340/172.5 |
| 4,287,561 | 9/1981 | Liptay | 364/200 |
| 4,855,947 | 8/1989 | Zmyslowski et al. | 364/200 |
| 4,916,652 | 4/1990 | Schwarz et al. | 395/375 |
| 5,051,940 | 9/1991 | Vassiliadis et al. | 364/736 |
| 5,131,086 | 7/1992 | Circello et al. | 395/375 |
| 5,163,139 | 11/1992 | Haigh et al. | 395/375 |
| 5,253,349 | 10/1993 | Kreitzer | 395/375 |

FOREIGN PATENT DOCUMENTS 0 437 044  12/1990  European Pat. Off. .

*Primary Examiner*—Daniel H. Pan
*Attorney, Agent, or Firm*—Mark E. McBurney; Andrew J. Dillon

[57] ABSTRACT

A method and system for increased instruction synchronization efficiency in a superscalar processor system which includes instructions having multiple source and destination operands. Simultaneous dispatching of multiple instructions creates a source-to-destination data dependency problem in that the results of one instruction may be necessary to accomplish execution of a second instruction. Data dependency hazards may be eliminated by prohibiting each instruction from dispatching until all possible data dependencies have been eliminated by the completion of preceding instructions; however, instruction dispatch efficiency is substantially decreased utilizing this technique. Data dependency interlock circuitry may be utilized to clear possible data dependency hazards; however, the complexity of such circuitry increases dramatically as the number of interlocked sources and destinations increases. The method and system of the present invention utilizes data dependency interlock circuitry capable of interlocking two source operands by two destination operands for each instruction. Instructions having three or more source operands are interlocked at the dispatch stage for the first two source operands utilizing existing data dependency interlock circuitry. Thereafter, the instruction is dispatched only after data dependency hazards are cleared for the first two source operands, utilizing the data dependency interlock circuitry, and all instructions preceding the instruction have been completed, eliminating possible data dependency hazards for the third source operand. In this manner, instructions which include three source operands may be synchronized without requiring a substantial increase in data dependency interlock circuitry and with only a slight degradation in system efficiency.

4 Claims, 3 Drawing Sheets

METHOD AND SYSTEM FOR INCREASED INSTRUCTION SYNCHRONIZATION EFFICIENCY IN A SUPERSCALAR PROCESSSOR SYSTEM UTILIZING PARTIAL DATA DEPENDENCY INTERLOCKING

BACKGROUND OF THE INVENTION

1. Technical Field

The present invention relates in general to improved data processing systems and in particular to improvements in instruction synchronization efficiency in a superscalar data processing system. Still more particularly, the present invention relates to an improved method and system for eliminating data dependency hazards in a superscalar data processing system which includes instructions having a greater number of source operands than may be interlocked utilizing a data dependency interlock circuit.

2. Description of the Related Art

Designers of modern state-of-the-art data processing systems are continually attempting to enhance performance aspects of such systems. One technique for enhancing data processing efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In view of the pipelined nature of the processors in such systems care must be taken to ensure that a result from a particular instruction which is necessary for execution of a subsequent instruction is obtained prior to dispatching the subsequent instruction. One technique for ensuring that such so-called "data dependency hazards" do not occur is the restriction of the dispatching of a particular instruction until such time as all preceding instructions have been dispatched. While this technique ensures that data dependency hazards will not occur, the performance penalty encountered utilizing this technique is substantial.

As a consequence, modern superscalar data processing systems often utilize a so-called "data dependency interlock circuit." Such circuits contain logic which operates in concert with instruction dispatch circuitry to ensure that an instruction is not dispatched until such time as a result from a preceding instruction which is necessary for correct execution of that instruction has been obtained. The amount of logic required to implement a data dependency interlock circuit is directly proportional to the number of source operands within each instruction. A source operand is a field within an instruction which is utilized to access an operand within a register file, for utilization in execution of that instruction.

While data dependency interlock circuits permit data dependency hazards to be avoided without encountering the substantial performance penalty described above, the design and implementation of data dependency interlock circuits for instructions which include larger numbers of source and destination operands becomes quite complex. Existing superscalar data processing systems often utilize instructions which include two source operands; however, as the complexity of these systems increases the utilization of three source operand instructions is becoming more common. A data dependency interlock circuit capable of handling N instructions which may potentially include 3N source operands and 2N destination operands is quite cumbersome.

Thus, it should be apparent that a need exists for a method and system which permits the synchronization of instructions in an efficient manner wherein the instructions include a larger number of source operands than may be interlocked utilizing existing data dependency interlock circuitry.

SUMMARY OF THE INVENTION

It is therefore one object of the present invention to provide an improved data processing system.

It is another object of the present invention to provide an improved method and system for instruction synchronization efficiency in a superscalar data processing system.

It is yet another object of the present invention to provide an improved method and system for eliminating data dependency hazards in a superscalar data processing system which includes instructions having a greater number of source operands than may be interlocked utilizing existing data dependency interlock circuits.

The foregoing objects are achieved as is now described. Simultaneous dispatching of multiple instructions creates a source-to-destination data dependency problem in that the results of one instruction may be necessary to accomplish execution of a second instruction. Data dependency hazards may be eliminated by prohibiting each instruction from dispatching until all possible data dependencies have been eliminated by the completion of preceding instructions; however, instruction dispatch efficiency is substantially decreased utilizing this technique. Data dependency interlock circuitry may be utilized to clear possible data dependency hazards; however, the complexity of such circuitry increases dramatically as the number of interlocked sources and destinations increases. The method and system of the present invention utilizes data dependency interlock circuitry capable of interlocking two source operands by two destination operands for each instruction. Instructions having three or more source operands are interlocked at the dispatch stage for the first two source operands utilizing existing data dependency interlock circuitry. Thereafter, the instruction is dispatched only after data dependency hazards are cleared for the first two source operands, utilizing the data dependency interlock circuitry, and all instructions preceding the instruction have been completed, eliminating possible data dependency hazards for the third source operand. In this manner, instructions which include three source operands may be synchronized without requiring a substantial increase in data dependency interlock circuitry and with only a slight degradation in system efficiency.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
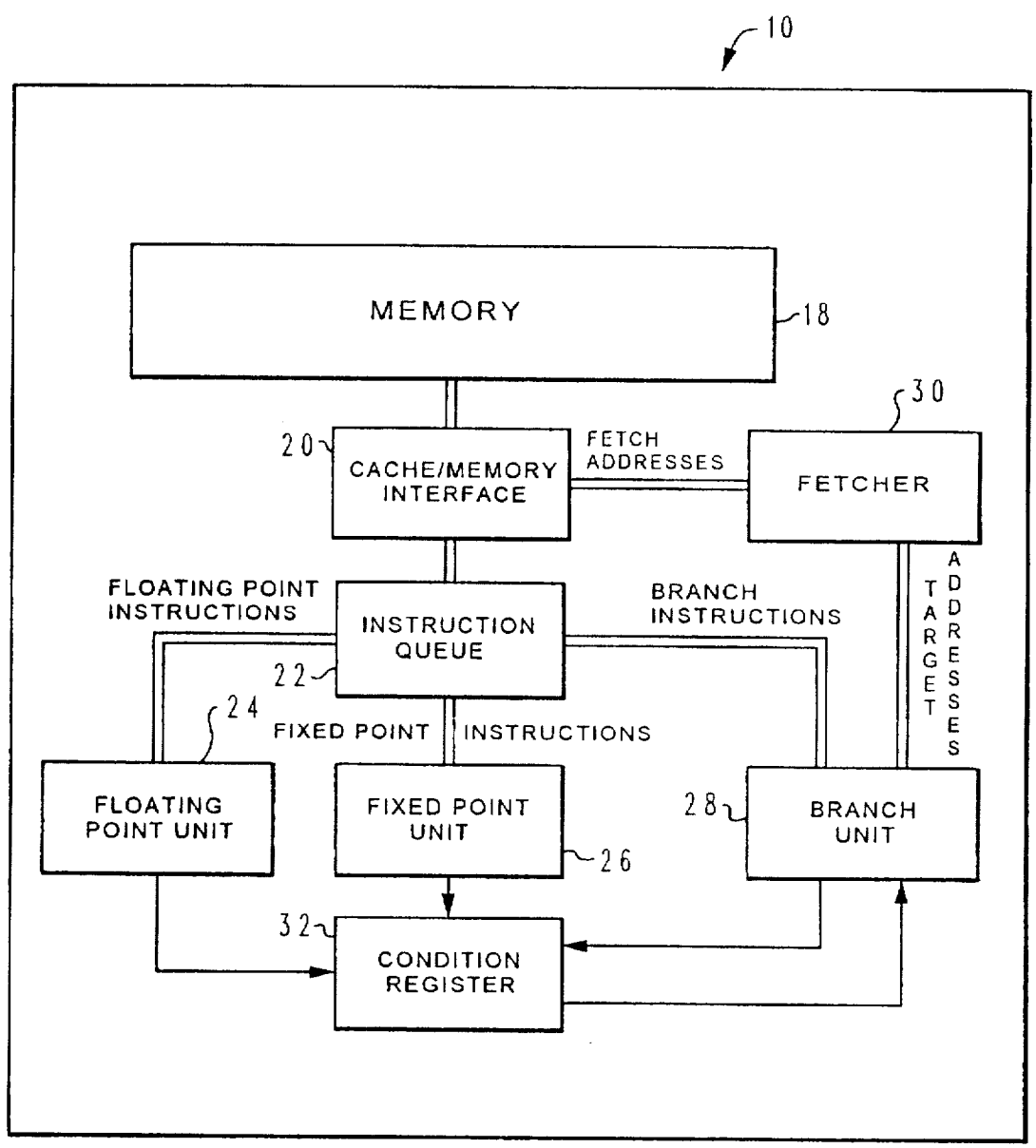
FIG. 1 is a high level block diagram of a superscalar data processing system which may be utilized to implement the method and system of the present invention.

With reference now to the figures and in particular with reference to FIG. 1, there is depicted a high level block diagram of a superscalar data processing system 10 which may be utilized to implement the method and system of the present invention. As illustrated, data processing system 10 includes a memory 18 which is utilized to store data, instructions and the like. Data or instructions stored within memory 18 are preferably accessed utilizing cache/memory interface 20 in manner well known to those having skill in the art. The sizing and utilization of cache memory systems is a well known subspeciality within the data processing art and is not addressed within the present application. However, those skilled in the art will appreciate that by utilizing modern associative cache techniques, a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a superscalar data processing system each position within the instruction queue may include between four and six instructions and thus, in a given cycle, up to six instructions may be loaded into instruction queue 22, depending upon how many valid instructions are passed by cache/memory interface 20 and how much space is available within instruction queue 22.

As is typical in such superscalar data processing systems, instruction queue 22 is utilized to dispatch instructions to multiple execution units. As depicted within FIG. 1, data processing system 10 includes a floating point processor unit 24, a fixed point processor unit 26, and a branch processor unit 28. Thus, instruction queue 22 may dispatch multiple instructions during a single cycle, one to each execution unit.

Figure 2:
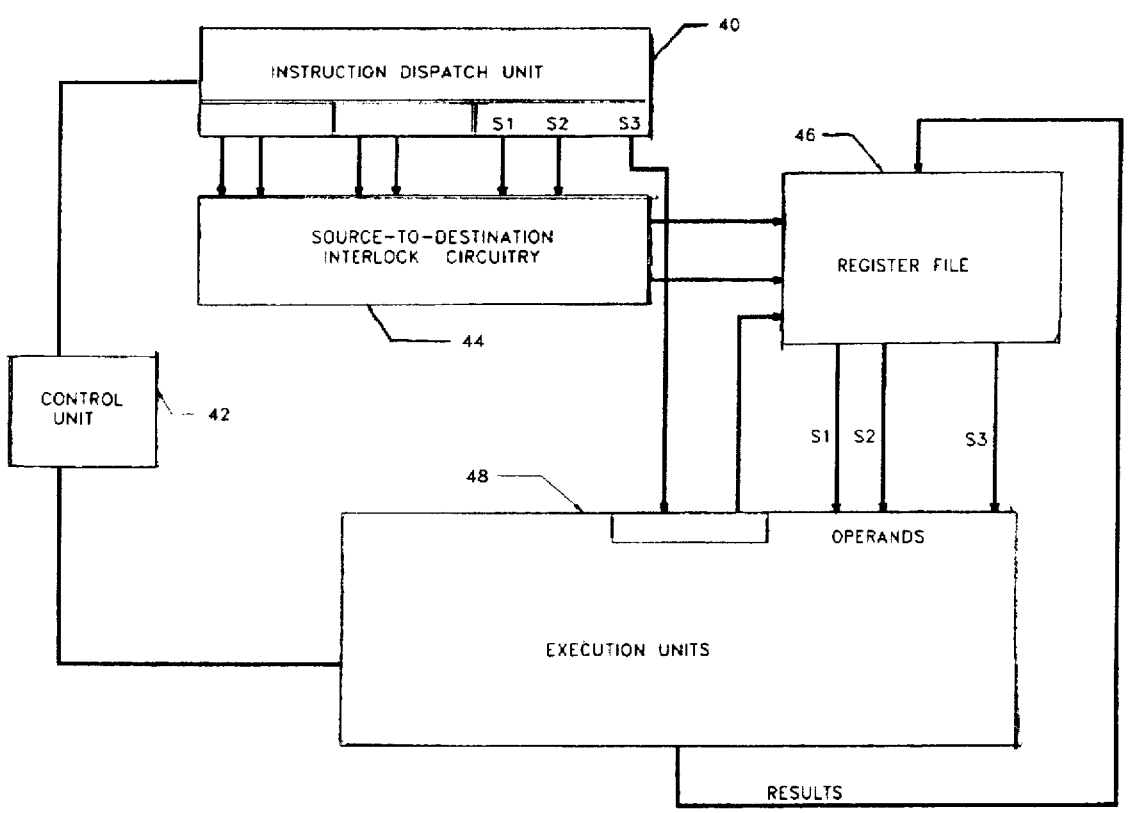
FIG. 2 is a more detailed block diagram of the instruction dispatch circuitry of the superscalar data processing system of FIG. 1 which may be utilized to implement the method and system of the present invention.

Referring now to FIG. 2, there is depicted a more detailed block diagram of the instruction dispatch circuitry of the superscalar data processing system of FIG. 1 which may be utilized to implement the method and system of the present invention. As illustrated, an instruction dispatch unit 40 is depicted which is utilized to dispatch instructions from instruction queue 22 (see FIG. 1) to the multiple execution units within data processing system 10, depicted collectively within FIG. 2 as execution units 48. The dispatching of instructions from instruction dispatch unit 40 is controlled utilizing control unit 42, which may be implemented utilizing either hardware or software elements and which serves to control the dispatching of instructions by instruction dispatch unit 40 to execution units 48. For purposes of illustration, a single instruction is depicted in greater detail within instruction dispatch unit 40, that instruction including three source operands, namely: S1; S2; and S3.

As is common in existing superscalar data processing systems a source-to-destination interlock circuit 44 may be provided which is capable of interlocking two source operands with two destination operands, to ensure that data dependency hazards for such operands clear prior to permitting dispatch of an instruction containing these operands. Each source operand, as those skilled in the art will appreciate, is utilized to access an operand within register file 46.

In accordance with an important feature of the present invention, source operands S1 and S2 are interlocked utilizing source-to-destination interlock circuit 44 and source operand S3 is coupled directly to execution units 48. Execution units 48 may then couple source operand S3 to register file 46, to locate and access the operand associated with source operand S3.

In accordance with an important feature of the present invention, after possible data dependency hazards for source operands S1 and S2 have cleared, as determined by source-to-destination interlock circuit 44, and after the data from register file 46 associated with these source operands has been returned to execution units 48, a determination is made as to whether or not all instructions preceding source operand S3 have completed. After achieving completion of all preceding instructions, the data associated with source operand S3 is returned from register file 46 to execution units 48 and the three source instruction is dispatched to the execution units.

In this manner the complexity of the interlock circuitry required to interlock the source operands and destination operands is reduced by thirty-three percent and overall performance of data processing system 10 is degraded only slightly, since three source operands are not frequently utilized. Thus, the method and system of the present invention processes three source operand instructions by delaying dispatch of such instructions until all preceding instructions have completed, eliminating possible data dependency hazards. By delaying dispatch of only those instructions which include greater than two source operands the overall performance of the system is greatly enhanced over systems which delay dispatch of all instructions until such time as preceding instructions have been completed.

Figure 3:
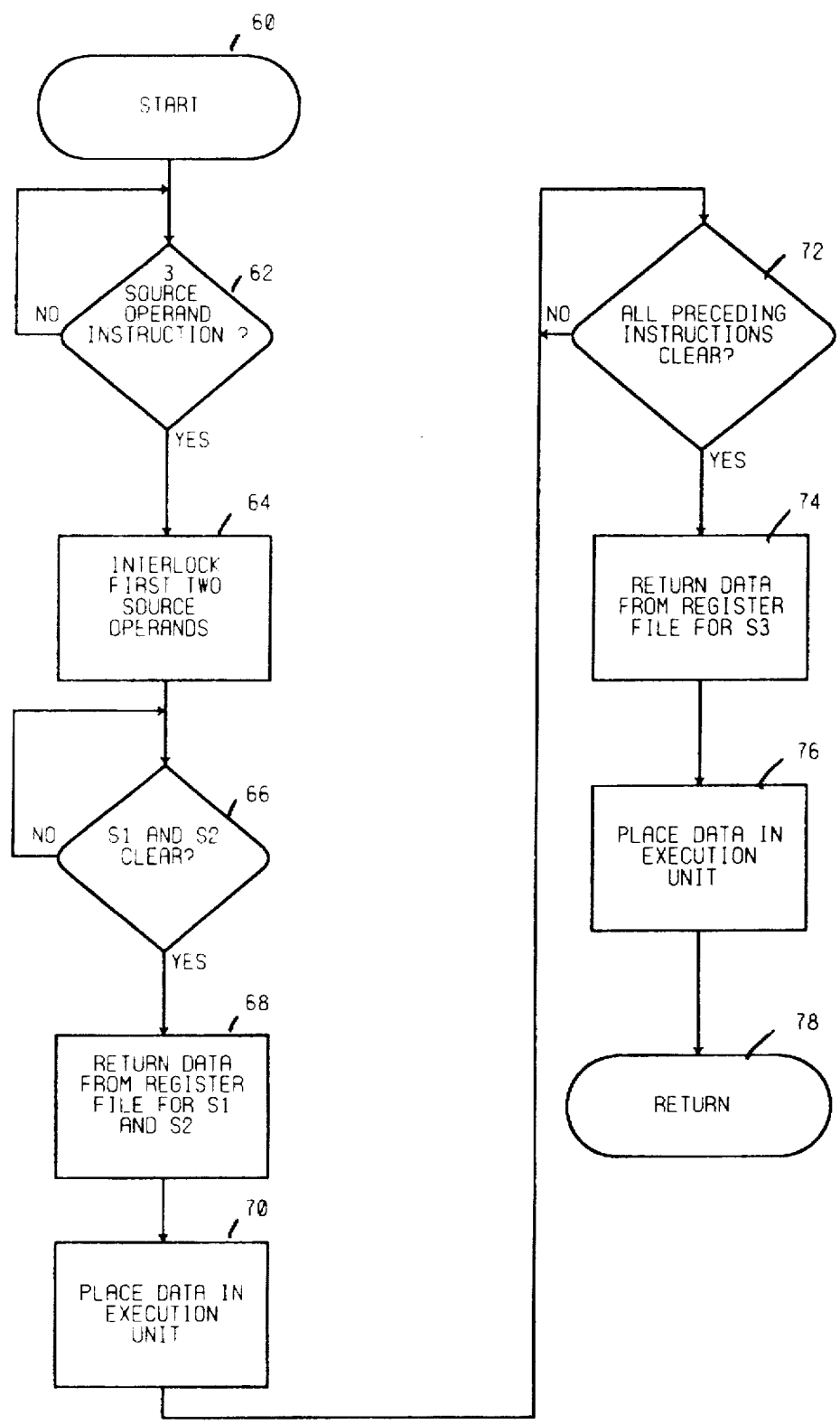
FIG. 3 is a logic flowchart which illustrates the instruction dispatch process in accordance with the method and system of the present invention.

With reference now to FIG. 3, there is depicted a logic flowchart which illustrates the instruction dispatch process in accordance with the method and system of the present invention. As illustrated, the process begins at block 60 and thereafter passes to block 62. Block 62 illustrates a determination of whether or not the current instructions is a three source operand instruction. If not, the process merely iterates until such time as a three-source operand instruction is encountered. Still referring to block 62, in the event the current instruction is a three source operand instruction the process passes to block 64. Block 64 illustrates the interlocking of the first two source operands utilizing source-to-destination interlock circuitry unit 44 (see FIG. 2), in a manner well known in the prior art.

Next, the process passes to block 66. Block 66 illustrates a determination of whether or not the first two source operands within the current instruction have cleared possible data dependencies. If not, the process merely iterates until such time as the first two source operands have cleared possible data dependencies, as determined by source-to-destination interlock circuit 44. Thereafter, the process passes to block 68. Block 68 illustrates the returning of data from register file 46 (see FIG. 2) which is associated with the first two source operands within the current instruction to the execution units. That data is then placed within the execution unit, as a depicted at block 70.

Next, the process passes to block 72. Block 72 illustrates a determination of whether or not all instructions which precede the present instruction, which incorporates three source operands, have cleared. If not, the process merely iterates until such time as all preceding instructions have cleared. After all instructions preceding the instruction which includes a third source operand have cleared, the process passes to block 74. Block 74 illustrates the returning of data from the register file for the third source operand. Thereafter, this data is placed within the execution units, as depicted at block 76. Finally, the process returns, as illustrated at block 78.

Upon reference to the foregoing those skilled in the art will appreciate that the Applicants herein have provided a method for increasing instruction dispatch efficiency in the handling of instructions which include greater than two source operands by permitting such instructions to be interlocked normally for the first two source operands and thereafter presuming a data dependency for all preceding instructions. Thus, instructions which include a third source operand are not dispatched until the completion of all preceding instructions. In this manner the efficiency of the system is greatly enhanced by eliminating the requirement for increased complexity in the source-to-destination interlock circuitry unit while degrading system performance only slightly upon the encountering of an instruction which includes three source operands.

While the invention has been particularly shown and described with reference to a preferred embodiment, it will be understood by those skilled in the art that various changes in form and detail may be made therein without departing from the spirit and scope of the invention.

We claim:

1. A method for increased efficiency in instruction synchronization in a superscalar processor system capable of simultaneously dispatching multiple scalar instructions having multiple source and destination operands and having source-to-destination dependency interlock circuitry capable of interlocking N source operands and M destination operands to prevent data dependency hazards, said method comprising the steps of:

dispatching each scalar instruction within said superscalar processor system which includes no more than N source operands upon elimination of possible data dependency hazards, as indicated by said source-to-destination dependency interlock circuitry; and dispatching each scalar instruction which includes more than N source operands only upon elimination of possible data dependency hazards for a first N source operands as indicated by said source-to-destination dependency interlock circuitry and a completion of all preceding instructions, wherein possible data dependencies for scalar instructions which include N+1 or more source operands are avoided without requiring additional dependency interlock circuitry.

2. The method for increased efficiency in instruction synchronization in a superscalar processor system according to claim 1, wherein said superscalar processor system includes a register file and wherein said method further includes the step of reading a designated operand from said register file in response to each source operand within each scalar instruction.

3. A system for increased efficiency in instruction synchronization in a superscalar processor system capable of simultaneously dispatching multiple scalar instructions having multiple source and destination operands, said system comprising:

a source-to-destination dependency interlock circuit for interlocking N source operands and M destination operands to prevent data dependency hazards; and instruction dispatch means coupled to said source-to-destination dependency interlock circuit for dispatching each scalar instruction within said superscalar processor system which includes no more than N source operands upon elimination of possible data dependency hazards, as indicated by said source-to-destination dependency interlock circuit and for dispatching each scalar instruction which includes more than N source operands only upon elimination of all possible data dependency hazards for a first N source operands, as indicated by said source-to-destination dependency interlock circuit and completion of all preceding instructions wherein possible data dependencies for scalar instructions which include N +1 or more source operands are avoided without requiring additional dependency interlock circuitry.

4. The system for increased efficiency in instruction synchronization in a superscalar processor system according to claim 3, wherein said superscalar processor system includes a register file and wherein said system further includes means for reading a designated operand from said register file in response to each source operand within each scalar instruction.

* * * * *